March 17, 1936. W. L. MORGAN 2,034,308
MARKED MATERIAL
Filed May 25, 1933
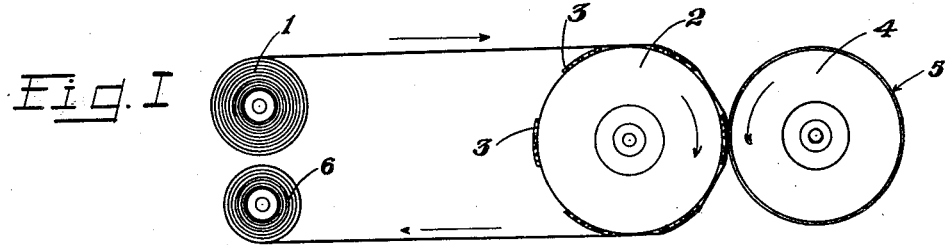
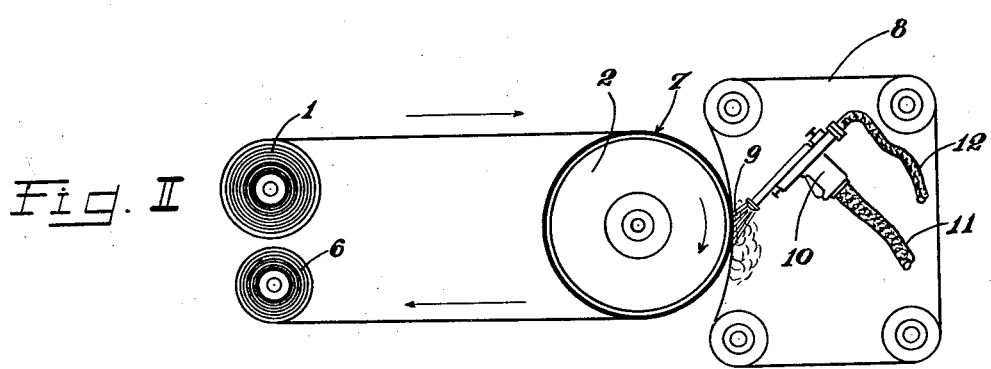
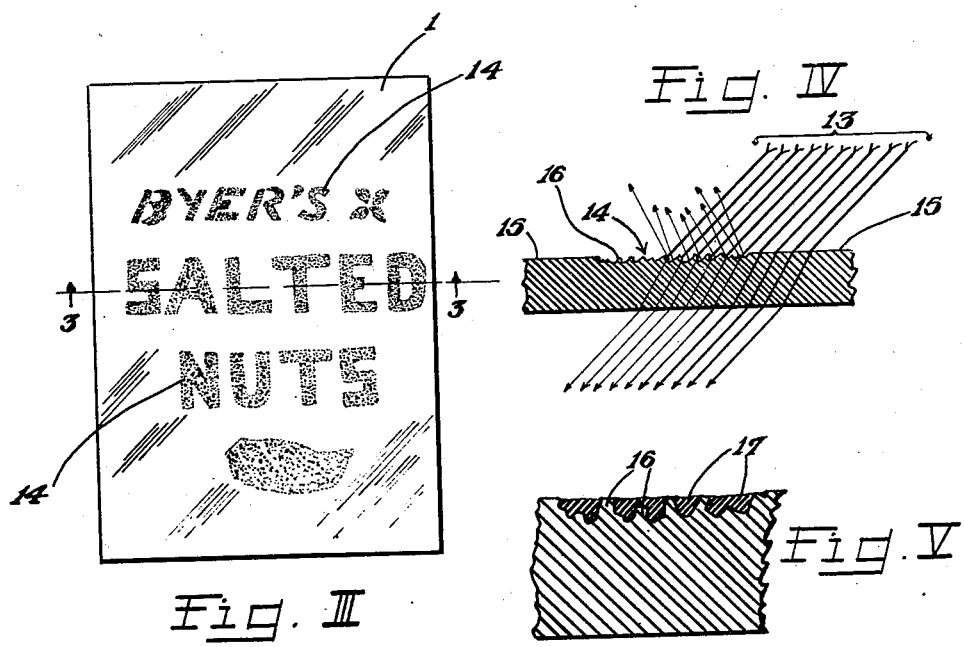
INVENTOR
Willard L. Morgan
BY
Watson, Bristol, Johnson & Leavenworth
ATTORNEYS Patented Mar. 17, 1936

2,034,308

UNITED STATES PATENT OFFICE 2,034,308

MARKED MATERIAL

Willard Leroy Morgan, Nutley, N. J., assignor to Sylvania Industrial Corporation, New York, N. Y., a corporation of Virginia Application May 25, 1933, Serial No. 672,834

3 Claims. (Cl. 91—67.9)

This invention relates in general to marked material and in particular to a novel wrapping material comprising a flexible, transparent sheet material bearing indicia.

The widespread use of flexible sheets or films of transparent materials such, for example, as glycerinated sheets of cellulose hydrate regenerated from viscose, for wrapping, laminating, printing, etc., has created a need for a method of applying to such materials decorative or identifying indicia which can not be removed and which are difficult to duplicate. It has been suggested to apply a printed design in such a manner as to leave an opaque layer. Such printed designs are not satisfactory, among other reasons because they may be readily removed by scraping or by the use of a suitable solvent, and may be readily duplicated. Furthermore, the additional thickness of the repeated printed designs causes unevenness in a roll of the finished material which gives rise to difficulty in the use of such rolls in automatic wrapping machinery and the like.

It is a general object of the present invention to provide flexible, transparent wrapping material with indicia which may be made to have a substantial optical contrast to the base, and which cannot be removed, altered or duplicated readily.

It is an object of the invention to provide as an article of manufacture, a flexible sheet or film of transparent wrapping material bearing indicia comprising predetermined areas of the material rendered optically distinguishable the remaining areas by a physical roughening or abrasion of the surface.

A more specific object of the invention is to provide a wrapping material comprising a flexible sheet or film of transparent material having abraded or roughened surface areas which contrast both in transparency and color from the remainder of the sheet or film of transparent material.

Other objects of the invention will in part be obvious and will in part appear hereinafter.

The invention accordingly comprises the article possessing the features and properties which are exemplified in the following detailed disclosure, and the scope of the invention will be indicated in the claims.

For a more complete understanding of the nature and objects of the invention, reference should be had to the following detailed description taken in connection with the accompanying drawing, in which:

Fig. I is a diagrammatical representation of a simple apparatus suitable for preparing the novel article comprising my invention;

Fig. II is a diagrammatical representation of another suitable type of apparatus;

Fig. III is a plan view of a sheet of material embodying one modification of the article of the invention and illustrative of that produced by the use of the apparatus shown in Figs. I and II;

Fig. IV is a sectional view, greatly enlarged, of the sheet of Fig. III taken along the line 3—3 thereof; and Fig. V is a view, similar to Fig. IV, showing an abrased and subsequently coated material.

Generally speaking, the article of the invention is produced by modifying the characteristics of predetermined areas of a flexible, transparent material by a physical roughening or abrading of the surface thereof. The abrasion of a flexible sheet or film of highly lustrous, transparent material such, for example, as regenerated cellulose, presents a special problem by reason of the fact that such material is relatively soft and plastic but of high surface tension. I have found, however, that if the surface of the material is brought into contact with a multiplicity of sharp edges of abrasive material in motion, there is an actual disruption of the surface of the material. The abraded areas are characterized by roughened surface comprising a multiplicity of small facets and being substantially opaque in optical contrast with the unabraded areas owing chiefly to the fact that the physically roughened surface reflects more light than the smooth portions of the material.

The article of the present invention may be produced from flexible sheets or films of transparent materials, e. g., regenerated cellulose, cellulose derivatives such as benzyl cellulose, ethoxy cellulose, nitrocellulose and cellulose acetate; gelatin, casein, and other synthetic or natural plastics. Such materials are usually transparent, but it is to be understood that flexible sheet materials which are somewhat translucent, or which may be said to have at least one homogeneous continuous phase, such as glassine, may be processed as herein described, and all such are referred to herein as transparent, flexible sheet materials.

In Fig. I, I have shown a simple embodiment of an apparatus suitable for producing the article of the invention in which flexible, transparent material from a mill roll 1 is passed over a suitable rotatable drum or roll 2 bearing on its surface a raised design 3. A second roll or rotatable drum 4 bearing on its surface a suitable abrasive material 5 such, for example, as a sheet of carborundum, is disposed with respect to roll 2 so that the abrasive material 5 makes substantial contact with the surface of the raised design 3 but not with the surface areas of the roll 2 lying between the designs. The peripheral speeds of the rolls 2 and 4 should be different, and preferably the abrasive material 5 should move faster than the design 3. The areas of the transparent material, predetermined by the design 3, are thus brought into contact with the moving abrasive and are physically disrupted. The marked material may be subsequently wound upon a finished roll 6.

In order to insure that the material is roughened only on the surface, the raised design is preferably made of rubber or other suitable resilient material which is adapted to be compressed slightly when in contact with the abrasive surface, as this prevents tearing or undue loss of strength or flexibility of the sheet material.

Having special reference to Fig. II, an embodiment of apparatus is shown in which the material from the mill roll 1 is passed over a suitable rotatable support or roll 2' which is preferably provided with a resilient material such, for example, as a resilient coating or covering 7 of rubber or the like, and thereafter is rolled on to the finished roll 6. Opposed to and lying closely adjacent to a point, line or arc on the roll 2' is a stencil 8 through the openings of which a stream or blast 9 of finely divided abrasive material is played upon the surface of the sheet material. The stream or blast 9 of abrasive material may be produced by the use of a suitable device 10 provided with means 11 for supplying finely divided abrasive material and means 12 for supplying gas or other fluid such as air at a suitable pressure. If the stencil is fixed and the sheet material is moved therepast a continuous longitudinal abrasion will result whereby ruled effects may be readily obtained.

The stencil 8 may comprise a repeated design or series of designs cut in an endless band, as shown, and may be moved synchronously and either continuously or intermittently with the sheet material. By disposing the stencil band so that it moves at an angle to the moving sheet material diagonal ruled effects may be obtained.

Other conditions remaining constant, I have found that the degree of contrast of the indicia on the materials of the class described substantially depends on the physical characteristics of the abrasive material, such as hardness, fineness, color, etc., as well as on the pressure and time of contact. Thus, by modifying one or more of these factors, indicia having a wide range of contrast with the unroughened areas may be produced. For treatments lying between a few seconds and one minute, there may be employed particles of size of from about 30 mesh to 300 mesh and an air pressure of from about 5 pounds to 60 pounds per square inch. For example, to produce a substantially opaque design on regenerated cellulose, I may employ an exposure of half a minute with a blast of 220 mesh carborundum and an air pressure of 16 pounds per square inch.

The abrasive material may comprise sand, carborundum, fluorite, calcite or other materials of suitable hardness. When the marked material is to be cut into sheets, I prefer to employ those abrasives which are softer than steel to prevent damage to the cutting knives by any abrasive particles which may remain on the material.

It is obvious that without departing from the scope of the invention, one may employ a rotating, stiff wire brush or other suitable abrading device to replace the rotating, abrasive roll 4 of the first mentioned modification, or to replace the blast 9 of the second modification.

If desired, the indicia may be applied to the base sheet material before and/or after the material has been coated, impregnated, printed, laminated or otherwise formed into an article of commerce. When the indicia on the base sheet material are covered, subsequent to the abrading treatment, with a coating, it is obvious that such coating should be preferably more or less transparent and of a refractive index different from the base sheet material in order to afford sufficient optical contrast to the indicia. Interesting decorative effects may be produced by treating the roughened surface areas with coloring matter such, for example, as a paste of finely oil-ground pigment or bronzing powder which I have found will adhere to the roughened areas only, and form therein a deposit 17 as shown in Fig. V. Similar novel and desirable effects in colors may be produced by differentially dying the abraded and unabraded areas.

The sheets or films may be colorless, slightly tinted, dyed, or otherwise colored as may be desired for the purpose for which they are to be employed. When the base sheet material is colored, the abraded areas also contrast with the unabraded areas in color, the abraded surface appearing lighter in shade or hue by reflected light but darker by transmitted light.

An important feature of the present invention is that the indicia, whether colored or not, do not in anywise increase the thickness of the sheet material, so that it can be rolled in the usual manner and used without trouble in automatic wrapping machinery and the like.

Owing to the fact that the flexible transparent materials of the class described are more or less plastic, I have found that a certain amount of the comminuted abrasive becomes substantially permanently imbedded in the roughened areas, particularly when the roughening is carried out by the use of an air blast. In view thereof, novel and useful designs in colors may be produced by using a colored abrasive, such, for example, as comminuted ultramarine, or one which has been colored or admixed with a coloring matter, such, for example, as a mixture of carborundum and rouge.

From a consideration of Fig. IV it will be noted that the abrasion actually removes a part of the material at the surface of the sheet. Consequently the abraded areas have an irregular surface, no part of which is higher than the normal surface level of the sheet. Therefore, when the wrapping material of the present invention is wound up into a roll, the indicia will not produce unevenness, that is, unequal pressure areas, in the roll. The material in the abraded areas is broken-up so as to present a multiplicity of irregularly disposed facets which diffuse reflected light and reduce the apparent transparency of the sheet material.

As is shown diagrammatically in Fig. IV, when light rays 13 fall upon the surface of a flexible sheet of transparent material which has been physically roughened by abrasion in predetermined areas by suitable means, the ratio of reflected light to transmitted light is found to be greater for the abraded areas 14 than for the unabraded areas 15. This differential optical effect results from the reflection of the light from the multiplicity of small surfaces or facets 16 into which the original surface was broken by abrasion. When the sheet is colored as well as transparent, the optical effect of increased reflection from the abraded areas 14 is that of a lighter shade of color, and the indicia thus contrast with the unabraded material both in color and in transparency.

If desired, indicia having two or more degrees of optical contrast may be produced by providing, in the first mentioned modification of the apparatus, a relief design having faces at unequal heights, or, in the second modification, by employing several exposures or by employing in sequence abrasives of different physical characteristics.

It is characteristic of the indicia of this invention that the roughened areas need not be completely opaque, so as to permit of reading printed matter therethrough when the indicia are superimposed on the printed matter.

Particularly when the indicia are subsequently coated over or covered by laminating the marked sheet with suitable materials, the novel designs or marks will be difficult or substantially impossible to remove, alter or duplicate, and accordingly the use of this marked material will discourage piracy of trade marks or unfair competition by the sale of adulterated or inferior products under the mark of reputable brands.

The article of this invention is accordingly particularly adapted for use as a wrapping material, in which case the indicia may be used to enhance the appearance of the package. The expression "indicia" is intended to cover designs, legends and marks, whether for the purpose of decoration or for conveying information, or both, such, for example, as advertisements, trade marks, trade names and the like.

Since certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. As a wrapping material, a thin, transparent, flexible sheet of regenerated cellulose having indicia thereon comprising predetermined broken-up surface areas roughened by abrasion which present a multiplicity of facets lying within the plane of the surface of the sheet which diffuse reflected light and reduce the transparency of the sheet material, such areas being optically distinguishable from the unabraded areas.

2. As a wrapping material, a thin, transparent, flexible sheet of regenerated cellulose having indicia thereon comprising predetermined broken-up surface areas roughened by abrasion which present a multiplicity of facets lying within the plane of the surface of the sheet which diffuse reflected light, and a material of a color contrasting with the base sheet in said areas so that these areas distinguish from the unabraded areas in color and transparency.

3. As a wrapping material, a thin, transparent flexible sheet of regenerated cellulose having indicia thereon comprising predetermined broken-up surface areas roughened by abrasion which present a multiplicity of facets lying within the plane of the surface of the sheet which diffuse reflected light and reduce the transparency of the sheet material, and a comminuted abrasive material contrasting in color with the base sheet embedded in said areas so that these areas distinguish from the unabraded areas in color and transparency.

WILLARD LEROY MORGAN.